United States Patent
Talignani

[11] Patent Number: 5,244,675
[45] Date of Patent: Sep. 14, 1993

[54] AERATED, SPREADABLE CONFECTIONERY PRODUCT, OF THE KIND CONSTITUTED BY A WATER-IN-OIL EMULSION

[75] Inventor: Amilcare Talignani, Milan, Italy

[73] Assignee: L.C.F.T. Lugan Consulting Finance Trading Aktiengesellschaft, Vaduz

[21] Appl. No.: 837,493

[22] Filed: Feb. 18, 1992

[30] Foreign Application Priority Data

Feb. 21, 1991 [IT] Italy ............................ MI91A000438

[51] Int. Cl.$^5$ ............................................... A23G 3/00
[52] U.S. Cl. .................................... 426/572; 426/582; 426/613; 426/660
[58] Field of Search ............... 426/564, 582, 613, 572, 426/660

[56] References Cited

U.S. PATENT DOCUMENTS

| | | | |
|---|---|---|---|
| 4,425,369 | 1/1984 | Sakamoto et al. | 426/582 |
| 4,482,575 | 11/1984 | Olds | 426/582 |
| 4,493,853 | 1/1985 | Vajda et al. | 426/582 |
| 4,567,047 | 1/1986 | Wilson | 426/582 |
| 4,623,551 | 11/1986 | Giddey et al. | 426/564 |
| 4,855,155 | 8/1989 | Cavallin | 426/572 |

FOREIGN PATENT DOCUMENTS

| | | |
|---|---|---|
| 0121253 | 10/1984 | European Pat. Off. . |
| 0172787 | 2/1986 | European Pat. Off. . |
| 0256561 | 2/1988 | European Pat. Off. . |
| 0382291 | 8/1990 | European Pat. Off. . |
| 2165202 | 8/1973 | France . |
| 1434298 | 5/1976 | United Kingdom . |

Primary Examiner—Jeanette Hunter
Attorney, Agent, or Firm—Hedman, Gibson & Costigan

[57] ABSTRACT

The present invention relates to an aerated confectionery product of the type constituted by a "water-in-oil" (W/O) emulsion, in which the continuous, oil phase in said emulsion is constituted by a mixture of fats containing melted cheese and the aqueous phase in said emulsion comprises sugars and proteins such as, mainly, casein.

13 Claims, No Drawings

AERATED, SPREADABLE CONFECTIONERY PRODUCT, OF THE KIND CONSTITUTED BY A WATER-IN-OIL EMULSION

The present invention relates to an aerated confectionery product having the form of an aerated mass suitable for being extruded as stuffing product for cakes or baked products with the normal extrusion/metering facilities, and suitable for being spread.

Products spreadable, or suitable for being extruded (which may be aerated, or non-aerated), which exploit irreversible modifications of the proteinic elements for obtaining their typical structure, are known.

So, U.K. patent No. 1,261,910 teaches that an aerated product can be prepared by taking advantage of the intervention of lactic-acid-producing thermobacteria in order to modify the functional characteristics of the seralbumins contained in an aqueous dispersion to which a fat is added in order to obtain an emulsion.

The product is suitably processed by pasteurization, cooling, and emulsification.

The product obtained in that way shows a content of from 20 to 75% of total solids, from 0.5 to 25% of total proteins, and from 15 to 70% of fats.

One may observe that, typically, such a product does not contain sugar, and is based on a microbiological process to obtain the required consistency.

U.S. Pat. No. 3,851,070 teaches that a spreadable product can be obtained by taking advantage of the thermal modification consequent to the process of dehydration of previously hydrated soy proteins.

To the so modified proteins, amount of sugar of from 10 to 25%, of hydrogenated fats of from 1.5 to 3%, of soybean oil, emulsifiers, and other savoury components, are added.

The production technique is based on a sophisticated system of crystallization of the fat phase by fasting cooling with mechanical stirring, in order to prepare a stable matrix.

The typical feature of the product is that it shows a rather rich nutritional profile, even if the type of proteins, or vegetable origin only, is not totally noble. Furthermore, inasmuch as it is not aerated, the product tends to appear as a poorly preservable mass with a stringy structure. Furthermore, the system is impossible to be standardized.

U.S. Pat. No. 4,051,269 discloses a low-calories-content spreadable product with a structure analogous to margarine, which is obtained by starting form a water-in-oil (W/O) emulsion.

Also in this case, the structure is obtained by means of an irreversible modification of the proteins resulting from the heat treatment (at a temperature of from 70° to 105° C.) of an aqueous solution of milk proteins (caseins and lactalbumins) in an acidic medium, followed by a cooling down of 55°-38° C. and the end emulsification the modified and cooled proteinic solution into a fat phase. In that way, a W/O emulsion is obtained, which is constituted by 65-35% of aqueous phase and 35-65% of fat phase. Said thermal treatment makes it possible a degree of denaturation to be achieved, which is such as to increase the water absorption capabilities and the general emulsification properties.

The denaturation is controlled by the action of salts and/or pH modifiers. Such an operation is anyway carried out in the aqueous phase.

The fat phase, prepared separately, is added to the aqueous phase of the heat-denaturated proteins.

The physical-chemical characteristics of the end product are the following:

| (A) | Aqueous phase | 65-35% |
|---|---|---|
|  | Proteinic content of the aqueous phase | 9-24% |
|  | Percentage of casein in the proteinic fraction | 70-90% |
|  | Percentage of serum proteins in the proteinic phase | 30-10% |
|  | pH | 5.1-7.2% |
|  | Total salt content | 1.4-6.0% |
|  | NaCl | 1-5% |
| (B) | Oil phase | 35-65% |
|  | Percent content of animal fat | 0-100% |
|  | Percent content of vegetable fat | 100-0% |
|  | Percent content of poly-unsaturated fats | 4-40% |
|  | Spreadability at 4-15° C. |  |
|  | Structure: smooth, analogous to the structure of butter. |  |

An aeration treatment is not provided for.

U.S. Pat. No. 4,298,625 discloses an alimentary product in the form of an aerated plastic mass obtained from an "oil-in-water" (O/W) emulsion constituted by alimentary fat, milk proteins, water and sugars, and having the natural milk pH value (6.2-7.5). Also in this case, the structuring effect is obtained by means of the thermal modification of milk proteins, as it results from the chart reported in the specification, relating to the change in viscosity as a function of the treatment temperature. The basic raw material to prepare said product is sweetened, condensed, partially skimmed milk, with a well-defined proteinic ratio of caseins to serum proteins of 3.2-2.8:1.

The proteinic mass is essentially constituted by a oil-in-water emulsion according to a process, according to whith an aqueous phase (based on a condensed milk with a predetermined viscosity obtained by heat denaturation) and an oil phase are separately prepared, and the resulting emulsion is then pasteurized. The structuring of the product occurs according to the classic techniques of guided crystallization of the fats (by means of several passes through heat exchangers), as well as of lactose (by means of the addition of saturated suspensions of lactose microcrystals).

The resulting product is finally aerated.

The purpose of the present invention is of obtaining a confectionery product, to be typically consumed as a fast-breaker or as a snack, basically consisting of cheese, such as melted cheese in thin slices and spreadable cheese.

The desired product should display the typical spreadability of such products and should show a high-value nutritional profile.

Sweet snacks based on dairy products, such as, e.g., fresh cheese with added sugars, fruit juices or flavours, supplied as creams for being consumed on the spot, as such, or as spreadable product in combination with bread, cakes or other baked products, already exist on the market. Although these product are presented as fresh products, these preparations cannot anyway be industrially used for stuffing purposes for baked products, owing to their high moisture level, as a consequence of the migration phenomenon, which alters the overall consistency of the combination, also preventing it from being preserved, even at low temperatures.

Owing to the chemical composition and the viscosity of these fresh-cheese-based preparations, aerating them is practically impossible.

According to the present invention, in order to achieve said purpose an aerated, spreadable confectionery product of the type constituted by a "water-in-oil" (W/O) emulsion is provided, which is characterized in that the continuous, oil phase in said emulsion is constituted by a mixture of fats containing melted cheese and the aqueous phase in said emulsion comprises sugars and proteins such as, mainly, casein.

In order to increase the viscosity of the mix and block air bubbles inside the interior thereof, the present Applicant thought of using, as a structuring element, a melted cheese, whose plasticity and spreadability constitute ideal reference parameters for a product to be used as a stuffing means. Furthermore, melted cheese has, per se, such nutritional characteristics, as well as stability characteristics (it contains approximately 50% of solid matter), which enable it to be used in products to be stored at low temperature.

The smooth and compact structure, similar to margarine, secures the compliance with the rheologic and sensory characteristics required from a stuffing or spreadable product. However, a drawback which seems to be insormoutable is the impossibility to cause a mix of melted cheese to absorb air, owing to its stringy, extremely viscous structure, which renders said mix an impossible-to-be-processed one.

As well-known, melted cheese is obtained by modifying the characteristics of the proteinic fraction (casein) of cheeses of most different origins, by means of a treatment at a temperature lower than 60° C. (under vacuum), in the presence of suitable melting salts (polyphosphates, citrates and sodium chloride).

In order to increase the amount of proteinic fraction capable of absorbing water and generating an emulsion, rennet casein is added which, owing to the action of the melting salts, undergoes the same modifications as of caseins contained in cheese.

The presence of butter serves, besides affording flavour to the product, to improve the plasticity and spreadability thereof.

The standard composition of a melted cheese suitable for being used in the preparation of a spreadable, aerated cream according to the present invention, is as follows:

| | |
|---|---|
| * Total solids | from 40 to 60% |
| * Fats, referred to the dry matter | from 15 to 70% |
| * Casein, referred to the dry matter | from 28 to 45% |
| * Serum proteins, referred to the dry matter | from 0 to 0.5% |
| * Citrates, referred to the whole product | from 0.5 to 2% |
| * Polyphosphates, referred to the whole product | from 0.5 to 2% |
| * Sodium chloride | from 1 to 3.5% |

This product, as such, is not spreadable and cannot be extruded—at low, as well as high temperatures—on meal-based supports (cakes, crackers, "pan di spagna" and the like), unless its characteristics are modified to an unacceptable extent. On the other hand, it cannot be processed with either continuous or batchwise turbo-emulsifiers in order to reduce its density by air absorption, because the stringy structure of the basis prevents an acceptable mechanical whipping.

Such a reduction in density was possible heretofore only by means of treatment of chemical nature (i.e., with hydrogen peroxide), which are specifically forbidden by the applicable alimentary laws and which would anyway be uncontrollable at a commercial level.

In order to attain a mass capable of being shaped and extruded when cold, and which simultaneously is plastic and stable, with characteristics of lightness and a balanced nutritional profile, a formulation was developed which aims at excluding all those proteinic components which contain lactalbumins (or seralbumins).

The overall nutritional profile of the product was so studied as to supply it with a complex of sugars which allows said product to be absorbed in a balanced way also in relation with the other components (proteins and fats). It should anyway be stressed that the extremely low content of lactose (about 1%) guarantees that the product will be accepted also by those consumers who do not tolerate milk.

The mutual ratio of the several components is also such as to impart stability on the product, as well as storage resistance under refrigerated conditions.

Such a type of product, which exploits the functional characteristics of melted cheese, while retaining a high air absorption capability with such a low water content was inconceivable heretofore, because the use of melted cheese seemed to exclude any processability (air absorption, extrusion and spreadability) when cold.

According to the present invention, the desired product can be obtained with the use of a melted cheese having the characteristics cited hereinabove, which is capable of being melted again in a fat phase at 60° C. and under vacuum (in order to prevent darkening phenomena from occurring), simultaneously retaining its spreadability and portioning capability. Any changes in protein viscosity characteristics, such as they could occur in the presence of seralbumins, would alter the rheology of the product, giving it that "stringy" character which is extremely negative for this specific use.

An object of the present invention is also a process for preparing a confectionery product, which process comprises the following steps:
(a) melting the oil phase;
(b) preparing the aqueous phase;
(c) re-melting the melted cheese in the oil phase;
(d) preparing the W/O emulsion by mixing, at high temperature and under vacuum, the aqueous phase in the oil phase containing the melted cheese;
(e) cooling the emulsion;
(f) possibly adding further components;
(g) incorporating air into the so obtained plastic mass.

A process is disclosed in greater detail now, which is suitable for obtaining the confectionery product according to the present invention: a "water-in-oil" emulsion is prepared, using 53–65% of oil, continuous phase and 47–35% of aqueous, dispersed phase, The oil, continuous phase is prepared by dissolving the vegetable fat, butter, and the emulsifier which controls the crystallization, at 60° C., and adding the melted cheese, with stirring, until a homogeneous plastic mass is obtained.

The aqueous, dispersed phase is prepared by dissolving, at room temperature, in an as-small-as-possible water amount the various sugars (saccharose, inverted sugar, dextrose and honey) and the various proteins (sodium caseinate, vegetable proteins, hydrolysed gelatines). The aqueous solution is added to the oil phase with heating at 60° C. under vacuum, and with stirring, for a few minutes, until a homogeneous dispersion is obtained.

The emulsified mass is then discharge into suitable containers.

The mass inside the containers is kept cooled at least overnight at 4° C.

To the cooled mass, flavours, fresh cream and plastified butter are then added for flavour supplementing, and the whole mix is slowly stirred in order to obtain a uniform, smooth mix, without clumps.

To the mix a suitable emulsifier is added and the resulting mix is submitted to a continuous or intermittent mechanical shaking.

The product, aerated to a specific gravity comprised within the range of from 0.6 to 0.900, is extruded onto baked products, or is packed in portions, inside cups or containers.

In order to disclose the invention in greater detail, non-limitative examples of practical embodiments thereof are reported in the following.

EXAMPLE 1

In order to obtain 100 kg of a product with creamy consistency, the following procedure is followed:

A—Aqueous phase
a—10.0 kg of sugar
2.6 kg of dextrose
2.1 kg of sodium caseinate
0.26 kg of hydrolysed gelatine
0.17 kg of soy bean isolate
are pre-mixed with one another.
b—3.50 kg of inverted sugar
1.30 kg of honey
13.00 kg of water
9.90 kg of sugar
are mixed with one another until all components are completely dissolved.
c—the powder premix (a) is added to the solution (b) until a complete dispersion is obtained.
B—Oil phase
a—15.57 kg of palm oil
7.73 kg of butter
0.43 kg of monoglycerides
are dissolved at 50° C.
b—25.95 kg of melted cheese is added.
c—water-in-oil emulsion
42.83 kg of aqueous phase
49.68 kg of oil phase
are mixed with each other, under vacuum, at 60° C.

D—The amount of 92.51 kg of emulsion, cooled, is mixed and homogenised with:
2.65 kg of plasticized butter
1.75 kg of emulsifier
3.02 kg of fresh cream
0.08 kg of flavour.

E—The mixture, still cooled at 50° C., is whipped with a continuous whipping facility, and then is extruded.

With this composition, a mass is obtained, which has the following characteristics:

| | |
|---|---|
| fat matter | 34.10% |
| caseins | 6.18% |
| serum proteins | 0.18% |
| sugars | 26.08% |
| water | 28.23% |
| proteins/water ratio | 23.4/100 |

EXAMPLE 2

In order to obtain 100 kg of a product with a creamy consistency, the following procedure is followed:

A—Aqueous phase
a—7.00 kg of sugar
2.60 kg of dextrose
2.60 kg of sodium caseinate
0.30 kg of hydrolysed gelatine
0.17 kg of soy bean isolate
are pre-mixed with one another.
b—1.50 kg of inverted sugar
3.00 kg of honey
11.00 kg of water
9.90 kg of sugar
are mixed with one another until all components are completely dissolved.
c—the powder premix (a) is added to the solution (b) until a complete dispersion is obtained.
B—Oil phase
a—18.87 kg of palm oil
7.73 kg of butter
0.50 kg of monoglycerides
are dissolved at 50° C.
b—38.95 kg of melted cheese is added.
C—The water-in-oil emulsion is prepared
38.07 kg of aqueous phase
56.05 kg of oil phase
are mixed with each other, under vacuum, at 60° C.

D—The amount of 94.12 kg of emulsion, cooled, is mixed and homogenised with:
4.05 kg of fresh cream
1.75 kg of emulsifier
0.08 kg of flavour.

E—The mixture, still cooled at a temperature comprised within the range of from 1° to 5° C., is whipped with a continuous whipping facility, and then is extruded.

With this composition, a mass is obtained, which has the following characteristics:

| | |
|---|---|
| fat matter | 35.71% |
| casein | 7.15% |
| serum proteins | 0.20% |
| sugars | 22.84% |
| water | 31.38% |
| proteins/water ratio | 24.3/100 |

I claim:

1. An aerated spreadable confectionery product comprising a water-in-oil emulsion wherein the continuous oil phase comprises fats containing melted cheese and the aqueous phase comprises sugars and proteins, said proteins containing a major amount of casein.

2. A product according to claim 1 wherein said oil phase comprises melted cheese, butter, vegetable fats and said aqueous phase comprises saccharose, inverted sugar, dextrose and honey said oil phase comprises rennet casein, sodium caseinate, vegetable proteins and hydrolyzed gelatin.

3. A product according to claim 1, wherein said melted cheese has the following composition:

| | |
|---|---|
| Total solids | from 40 to 60% |
| Fats, [referred to the] based on dry matter | from 15 to 70% |
| Casein, [referred to the] based on dray matter | from 28 to 45% |
| Serum proteins [, referred to the] based on dry matter | from 0 to 0.5% |
| Citrates, [, referred to] based on the whole product | from 0.5 to 2% |
| Polyphosphates [, referred to] based on the whole product | from 0.5 to 2% |
| Sodium chloride | from 1 to 3.5%. |

4. A product according to claim 1 which contains fresh cheese.

5. A product according to claim 1 which contains fresh cream as a sapidity ingredient.

6. A product according to claim 1 which contains yogurt from lactic acid ferments.

7. Product according to claim 1, characterized in that it contains proteinic integrators, such as soy bean, sunflower.

8. A product according to claim 1, wherein said product contains tofu.

9. A product according to claim 1 which contains, as the fat in the oil phase, refined vegetable oil or hydrogenated vegetable oil with a melting point within the range of from 26° to 34° C.

10. A product according to claim 1 which is made by a process which comprises the following steps:
 (a) melting the oil phase and the cheese to form a mixture;
 (b) preparing the water-in-oil emulsion by mixing, at high temperature and under vacuum, the aqueous phase into the melted oil phase containing the cheese;
 (c) cooling the emulsion; and
 (d) incorporating air into the emulsion.

11. A process for preparing a confectionery product according to claim 1, comprising the following steps:
 (a) melting the il phase and the cheese to form a mixture;
 (b) preparing the water-in-oil emulsion by mixing, at high temperature and under vacuum, the aqueous phase into the melting oil phase containing the cheese;
 (c) cooling the emulsion; and
 (d) incorporating air into the emulsion.

12. A process according to claim 11, comprising the further step, before incorporating air of adding, to said emulsion pre-aerated components or components capable of causing air to be absorbed.

13. A process according to claim 11 wherein that said step is carried out at 60° C.

* * * * *